United States Patent
Morita et al.

(10) Patent No.: US 9,001,277 B2
(45) Date of Patent: Apr. 7, 2015

(54) TELEVISION APPARATUS, ELECTRONIC APPARATUS, AND LENS

(75) Inventors: Hirofumi Morita, Fussa (JP); Toshikatsu Nakamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 654 days.

(21) Appl. No.: 13/027,937

(22) Filed: Feb. 15, 2011

(65) Prior Publication Data

US 2011/0310309 A1    Dec. 22, 2011

(30) Foreign Application Priority Data

Jun. 18, 2010    (JP) ................................. 2010-139796

(51) Int. Cl.
*H04N 5/655*    (2006.01)
*G02B 19/00*    (2006.01)

(52) U.S. Cl.
CPC ........ *G02B 19/0066* (2013.01); *G02B 19/0009* (2013.01)

(58) Field of Classification Search
CPC ........... G02B 19/0066; G02B 19/0009; G02B 6/0003; G02B 6/0011
USPC ....................................................... 348/828
See application file for complete search history.

(56) References Cited

U.S. PATENT DOCUMENTS

| 7,456,805 B2 * | 11/2008 | Ouderkirk et al. ............. 345/32 |
| 2008/0239724 A1 | 10/2008 | Moriyama et al. |
| 2009/0167987 A1 * | 7/2009 | Kim et al. ....................... 349/65 |
| 2010/0060601 A1 * | 3/2010 | Oohira .......................... 345/173 |

FOREIGN PATENT DOCUMENTS

| JP | 04-23008 | 2/1992 |
| JP | 2002-162550 | 6/2002 |
| JP | 2004-200120 | 7/2004 |
| JP | 2006-064811 | 3/2006 |
| JP | 2007-171636 | 7/2007 |
| JP | 2008-251347 | 10/2008 |
| JP | 2010-003968 | 1/2010 |
| WO | 2005-091386 | 9/2005 |

OTHER PUBLICATIONS

Japanese Patent Application No. 2010-139796, Final Notice of Rejection, mailed Sep. 13, 2011, (with English Translation).
Japanese Patent Application No. 2010-139796, Notice of Reasons for Rejection, mailed Jun. 7, 2011, (with English Translation).

* cited by examiner

*Primary Examiner* — Richard Torrente
(74) *Attorney, Agent, or Firm* — Blakely, Sokoloff, Taylor & Zafman LLP

(57) ABSTRACT

An electronic apparatus includes, a printed wiring board, light emitting diodes provided on the printed wiring board and configured to emit light parallel to the printed wiring board, and a lens including light receiving parts corresponding to the light emitting diodes, respectively, and a display part configured to display light which has been emitted from the light emitting diodes and has entered through the light receiving parts. The lens is provided with a cutout portion extending from a position between the light receiving parts to the display part.

20 Claims, 15 Drawing Sheets

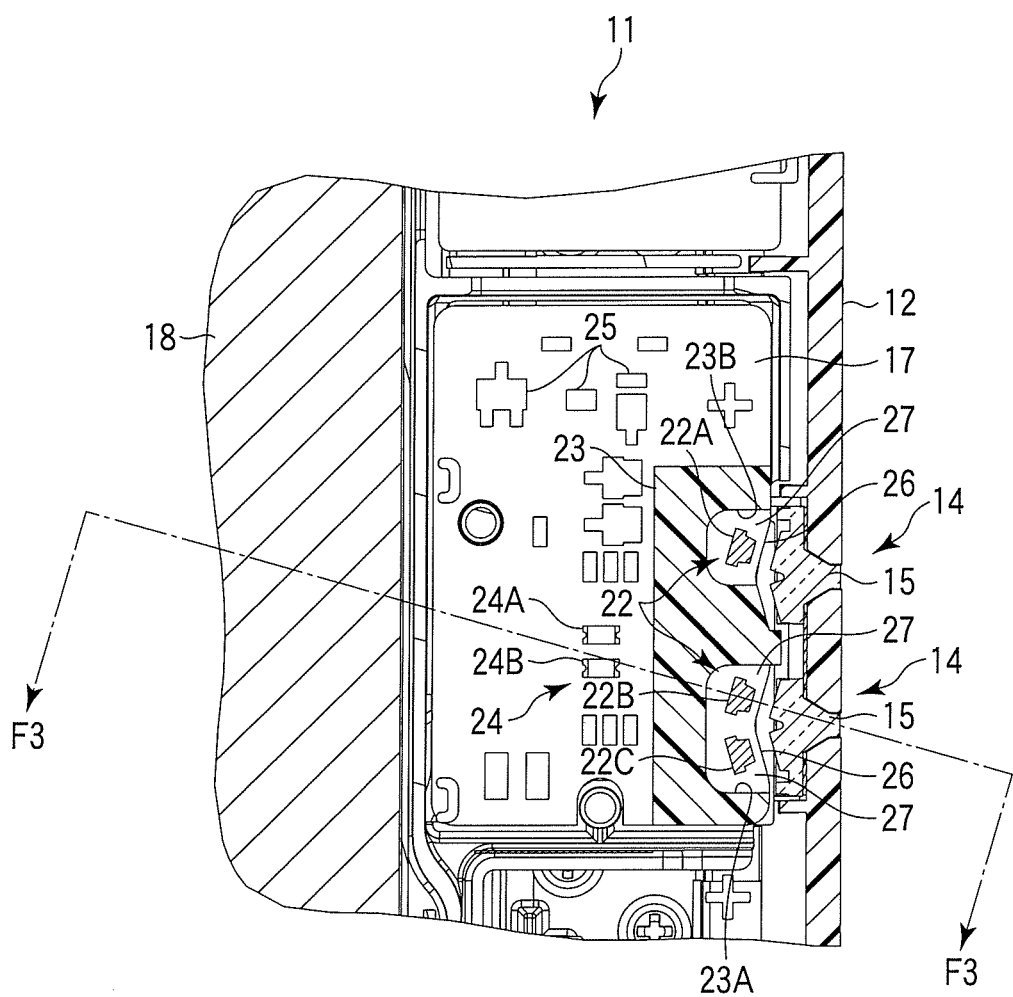
F I G. 2

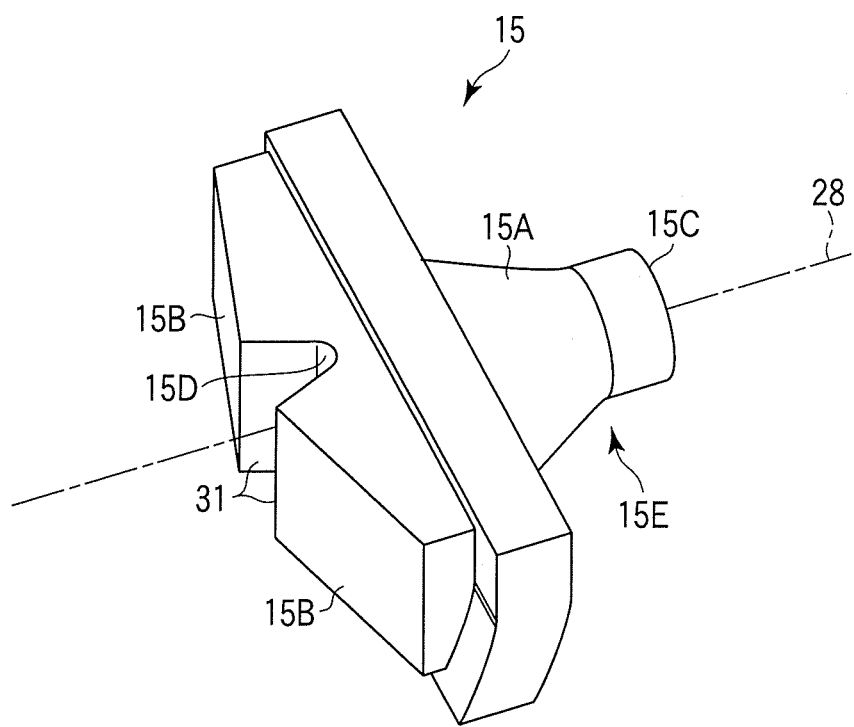
F I G. 4

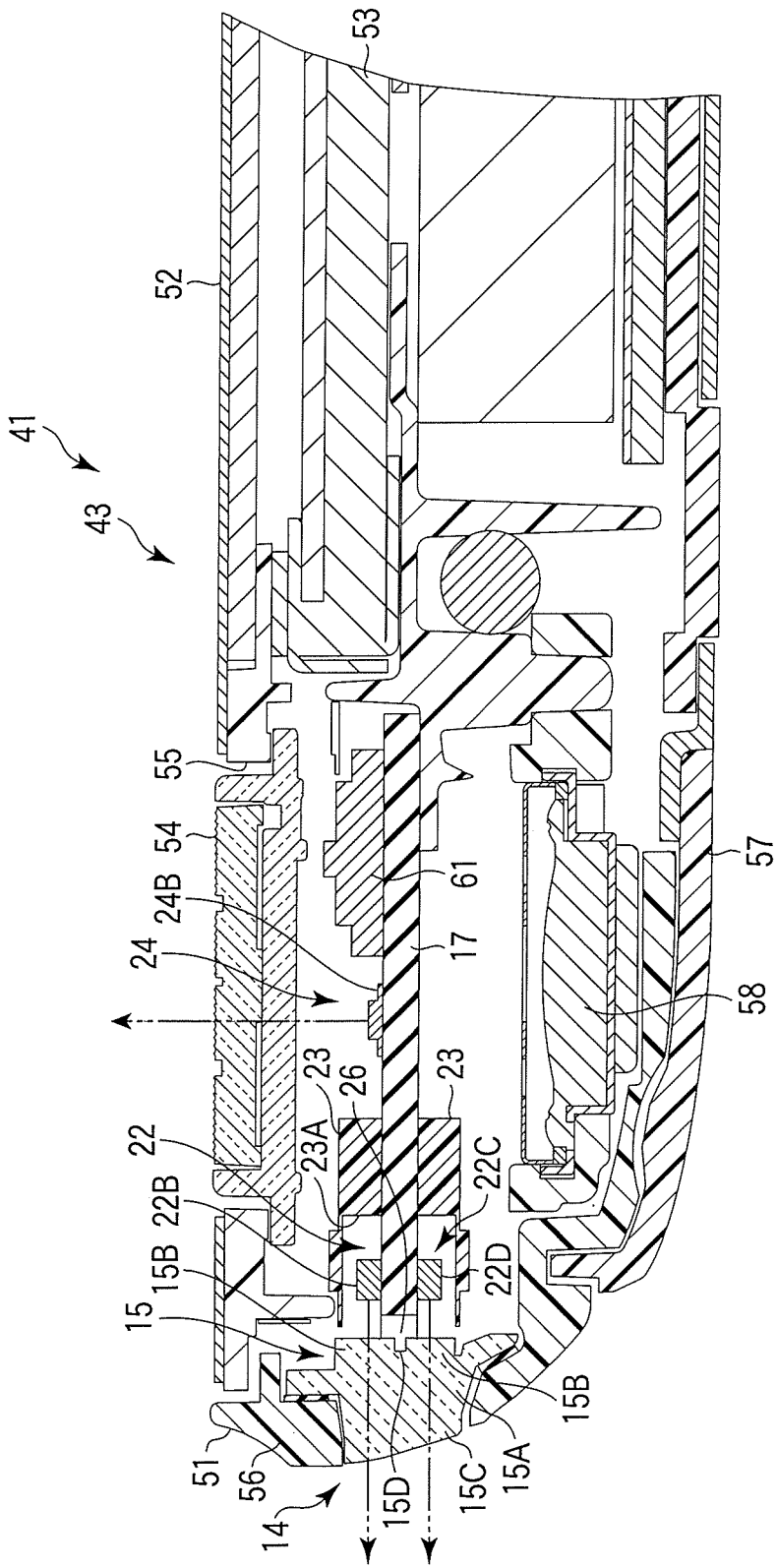
F I G. 12

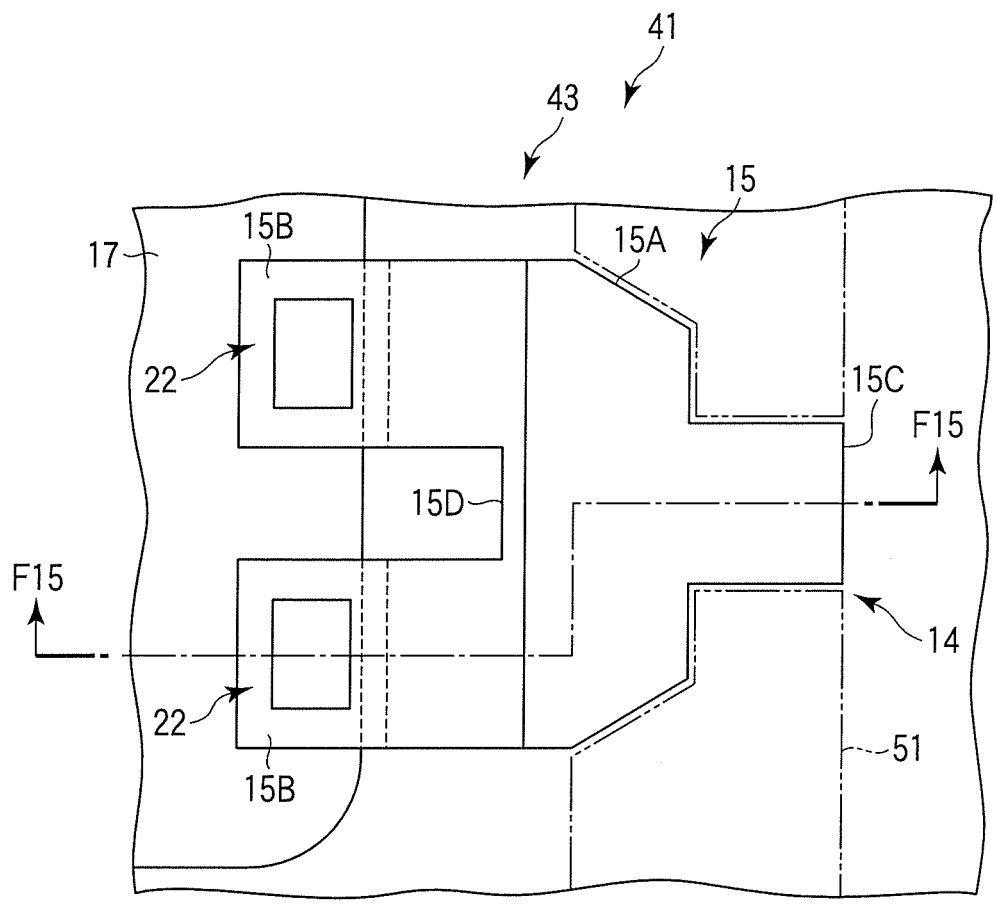
F I G. 14

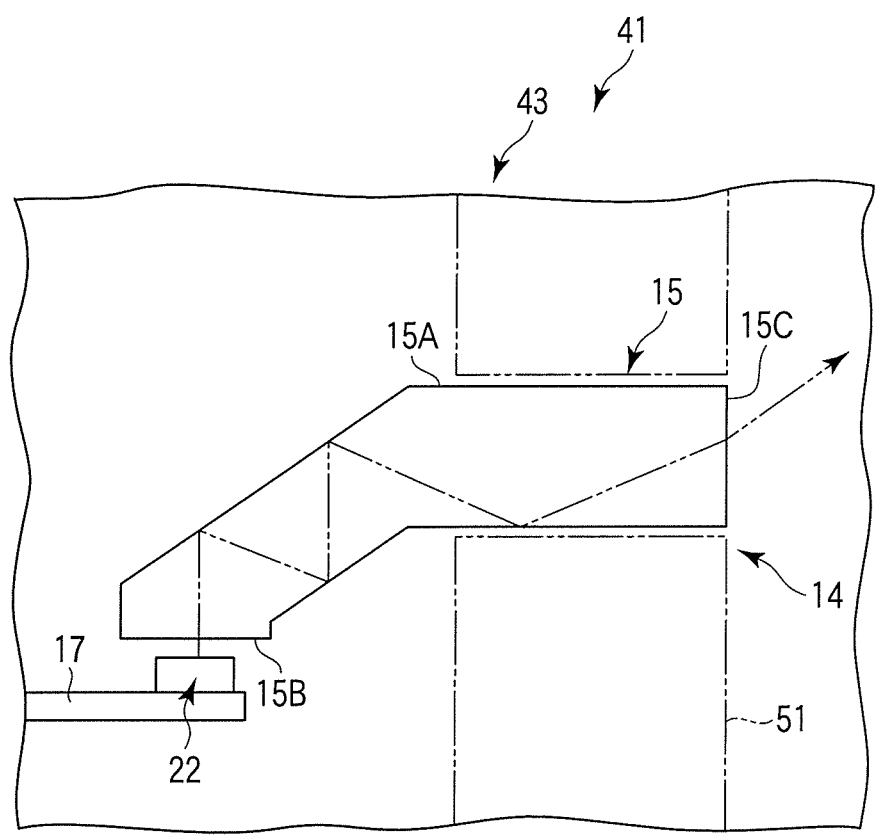
F I G. 15

TELEVISION APPARATUS, ELECTRONIC APPARATUS, AND LENS

CROSS-REFERENCE TO RELATED APPLICATIONS

This application is based upon and claims the benefit of priority from Japanese Patent Application No. 2010-139796, filed Jun. 18, 2010; the entire contents of which are incorporated herein by reference.

FIELD

Embodiments described herein relate generally to a television apparatus, electronic apparatus and lens comprising a light emitting diode.

BACKGROUND

In an electronic apparatus such as a television, a lens part is often illuminated by, for example, a light emitting diode (LED). Such an LED is opposed to, for example, a lens, and is configured to apply light to the lens to display, for example, the state of the electronic apparatus. Recently, multiple types of LEDs, which emit light of different colors, have been on the market.

It is convenient for users to display states of an electronic apparatus using an LED or the like. On the other hand, provision of too many LEDs is contrary to a demand for reduction in size of an electronic apparatus and for space saving within a case, and it is difficult to achieve the balance between the convenience and the demand.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary enlarged cross-sectional view of the vicinity of a printed wiring board of the television apparatus shown in FIG. 1.

FIG. 4 is an exemplary perspective view of a lens of the television apparatus shown in FIG. 3.

FIG. 12 is an exemplary cross-sectional view taken in a thickness direction of the portable computer shown in FIG. 11.

FIG. 14 is an exemplary enlarged plan view of the vicinity of a lens of a portable computer, which is an example of an electronic apparatus of a sixth embodiment.

FIG. 15 is an exemplary cross-sectional view of the portable computer shown in FIG. 14, taken along line F15-F15.

DETAILED DESCRIPTION

Various embodiments will be described hereinafter with reference to the accompanying drawings.

In general, according to one embodiment, a television apparatus includes, a printed wiring board, a plurality of light emitting diodes provided on the printed wiring board and configured to emit light parallel to the printed wiring board, and a lens including a plurality of light receiving parts corresponding to the light emitting diodes, respectively, and a display part configured to display light which has been emitted from the light emitting diodes and has entered through the light receiving parts. The lens is provided with a cutout portion extending from a position between the light receiving parts to the display part.

Figure 1:
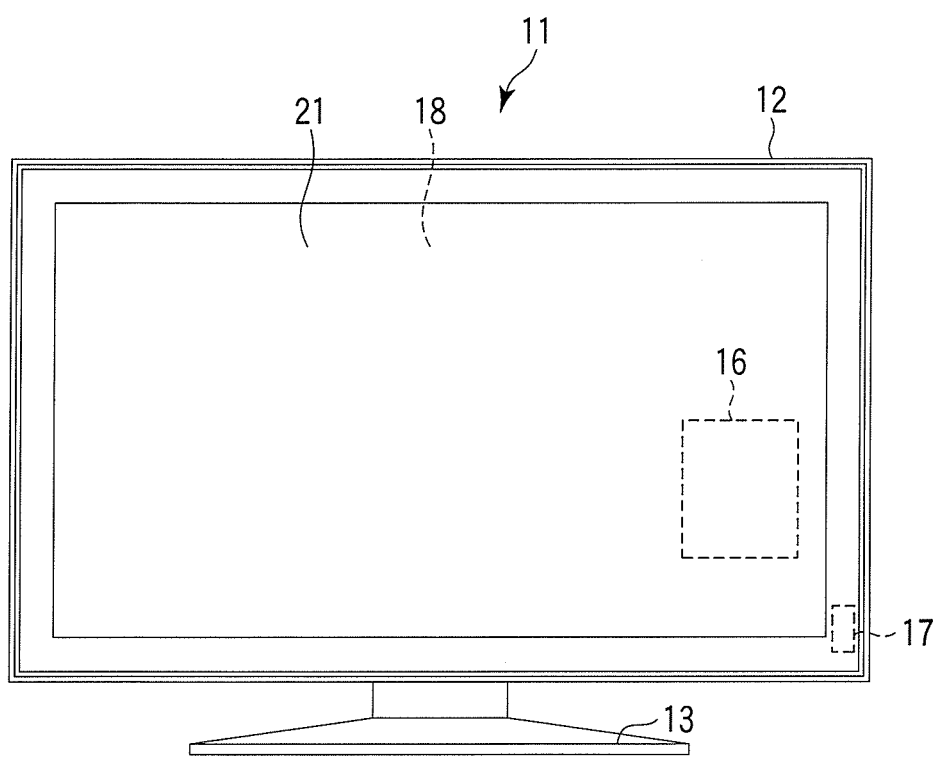
FIG. 1 is an exemplary elevational view showing a television apparatus, which is an example of an electronic apparatus of a first embodiment.

Referring to FIGS. 1-6, a first embodiment of an electronic apparatus will be described below. As shown in FIG. 1, a television apparatus 11, which is an example of the electronic apparatus of the present embodiment, is a slim display apparatus having a rectangular appearance. The television apparatus 11 comprises a housing 12 and a leg part 13 supporting the housing 12. As shown in FIG. 2, the housing 12 is provided with a pair of opening portions 14. The television apparatus 11 comprises a pair of lenses 15 fitted in the opening portions 14, respectively.

As shown in FIGS. 1 and 2, the television apparatus 11 comprises in the housing 12: a tuner substrate; a system substrate 16 which collectively controls parts of the television apparatus 11; a printed wiring board 17 electrically connected to the system substrate 16 via, for example, a flexible cable; and a flat-shaped display 18. The display 18 is formed of, for example, a liquid crystal display panel, but may be formed of another type of display panel, such as a plasma display panel.

Figure 3:
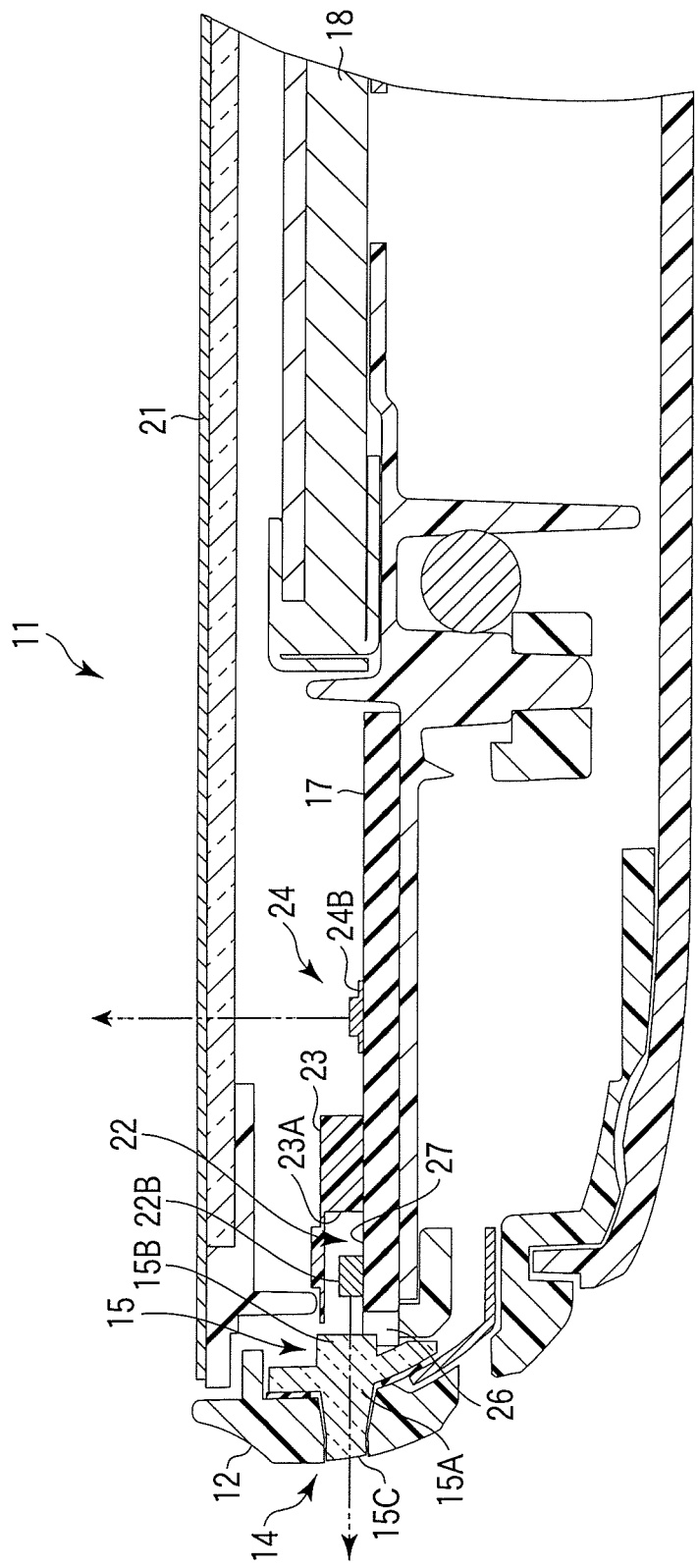
FIG. 3 is an exemplary cross-sectional view of the television apparatus shown in FIG. 2, taken along line F3-F3.

As shown in FIGS. 2 and 3, the television apparatus 11 comprises: a plate-like transparent cover 21 covering the surface of the display 18; a plurality of first light emitting diodes 22 provided on the printed wiring board 17; a shade 23 surrounding the first light emitting diodes 22; and a plurality of second light emitting diodes 24 provided on the printed wiring board 17 at positions separated from the first light emitting diodes 22.

In addition to the first light emitting diodes 22 (light sources) and second light emitting diodes 24, a plurality of circuit components 25 are mounted on the printed wiring board 17 at high density. The printed wiring board 17 is provided with: an approximately triangular concave portion 26 formed along the outer shape of light receiving parts 15B of each of the lenses 15; and an edge portion 27 defining the periphery of the concave portion 26.

The first light emitting diodes 22 are aligned on the edge portion 27 of the printed wiring board 17 on one surface of the printed wiring board 17. In the present embodiment, three first light emitting diodes 22 are provided on the printed wiring board 17, but the number is not limited to three. First light emitting diode 22A of the first light emitting diodes 22, which is the upper one in FIG. 2, emits, for example, orange light while, for example, a wireless LAN is operating, thereby notifying a user of the operation. First light emitting diode 22B of the first light emitting diodes 22, which is the middle one in FIG. 2, emits, for example, green light while, for example, a contained optical disk drive is operating, thereby notifying the user of the operation. First light emitting diode 22C of the first light emitting diodes 22, which is the lower one in FIG. 2, emits, for example, red light while, for example, a contained hard disk drive is being driven, thereby notifying the user of the operation. Further, the first light emitting diodes 22A-22C may be turned on at the same time to notify the user that something is wrong in the television apparatus 11.

As shown in FIG. 2, each of the first light emitting diodes 22 is provided on an imaginary straight line connecting a display part 15C and a light receiving part 15B of the lens 15, which will be described later. Each of the first light emitting diodes 22 is oriented and opposed to the display part 15C of the lens 15. In other words, each of the first light emitting diodes 22 is located in such a manner as to emit light to the display part 15C. The first light emitting diode 22 is a side-lighting-type light emitting diode, which is configured to emit light parallel to the printed wiring board 17.

As shown in FIGS. 2 and 3, the shade 23 is provided on the printed wiring board 17, and covers the side and top surfaces of the first light emitting diodes 22 at positions other than the pair of lenses 15. The shade 23 is provided with a first containing portion 23A which is a concave portion formed for containing therein two of the first light emitting diodes 22, and a second containing portion 23B which is a concave portion formed for containing therein one of the first light emitting diodes 22. The shade 23 separates the first light emitting diodes 22 from the second light emitting diodes 24, and prevents, for example, light emitted from the second light emitting diodes 24 from being applied to the lenses 15 opposed to the first light emitting diodes 22.

The second light emitting diodes 24 are located on the printed wiring board 17 away from the edge portion 27, i.e., on an approximately center portion of the printed wiring board 17. In the present embodiment, two second light emitting diodes 24 are provided on the printed wiring board 17, but the number is not limited to two. Each of the second light emitting diodes 24 is an upward-lighting-type diode, and is configured to emit light in a direction crossing (orthogonal to) a direction in which the printed wiring board 17 extends. Second light emitting diode 24A of the second light emitting diodes 24 emits light, for example, through the cover 21, and notifies the user of the power-on state. Second light emitting diode 24B of the second light emitting diodes 24 emits light, for example, through the cover 21, and notifies the user that the television apparatus 11 is in a power-saving mode, for example.

As shown in FIGS. 2 and 4, each of the lenses 15 comprises, a main part 15A shaped like a truncated cone, a plurality of light receiving parts 15B protruding from the lower base portion of the main part 15A to the first light emitting diodes 22 (light sources), a display part 15C provided on the upper base portion of the main part 15A, and a wedge-shaped cutout portion 15D provided between the light receiving parts 15B. Further, the main part 15A and display part 15C form a light guide part 15E for guiding light which has entered through the light receiving parts 15B to the surface of the display part 15C. The main part 15A, light receiving parts 15B and display part 15C are integrally formed of a transparent material, such as an acrylic resin. The main part 15A and display part 15C are fitted in the opening portion 14 of the housing 12.

Figure 5:
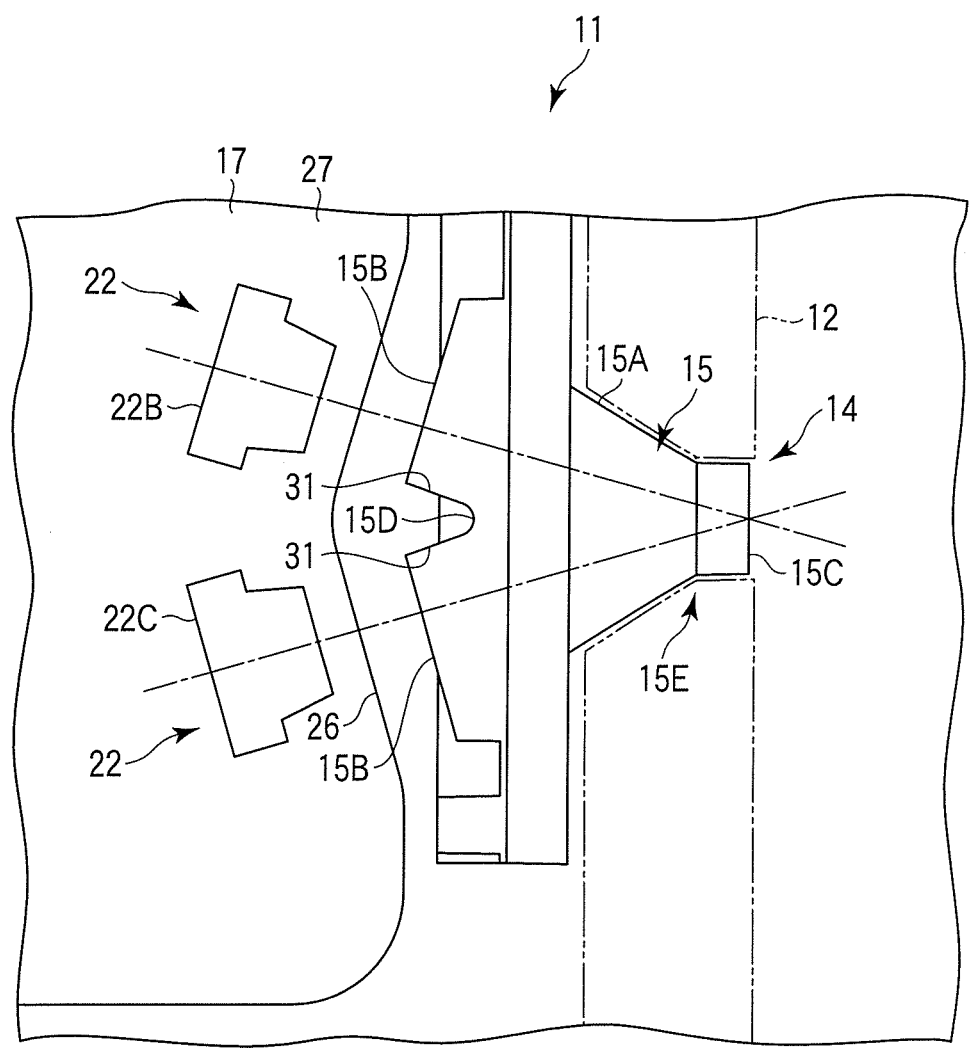
FIG. 5 is an exemplary enlarged plan view of the vicinity of the lens shown in FIG. 2.

As shown in, for example, FIGS. 4 and 5, the lens 15 is symmetrical (right-left symmetrical) with respect to a central axis 28 of the main part 15A. In the present embodiment, the lens 15 is provided with two light receiving parts 15B. One of the normal lines of the light receiving parts 15B agrees with an imaginary line connecting a first light emitting diode 22 and the display part 15C, which is indicated by a line of alternate long and short dashes as shown in FIG. 5. Accordingly, in the lens 15 of the present embodiment, the normal line of each of the light receiving parts 15B extends to the display part 15C.

The cutout portion 15D extends from a position between the light receiving parts 15B to the display part 15C. The cutout portion 15D has a substantially V-shaped cross section. As shown in FIG. 5, a surface 31 defining the cutout portion 15D is substantially parallel to an imaginary line connecting each of the first light emitting diodes 22 to the display part 15C.

As shown in FIG. 2, the light receiving parts 15B are fitted in the concave portion 26 of the printed wiring board 17 in such a manner as to correspond to the first light emitting diodes 22, respectively. The display part 15C displays light which has been emitted from the first light emitting diodes 22 and has entered through the light receiving parts 15B. The display part 15C has a surface processed (subjected to texturing) to increase surface roughness, and can diffuse light at the surface.

Figure 6:
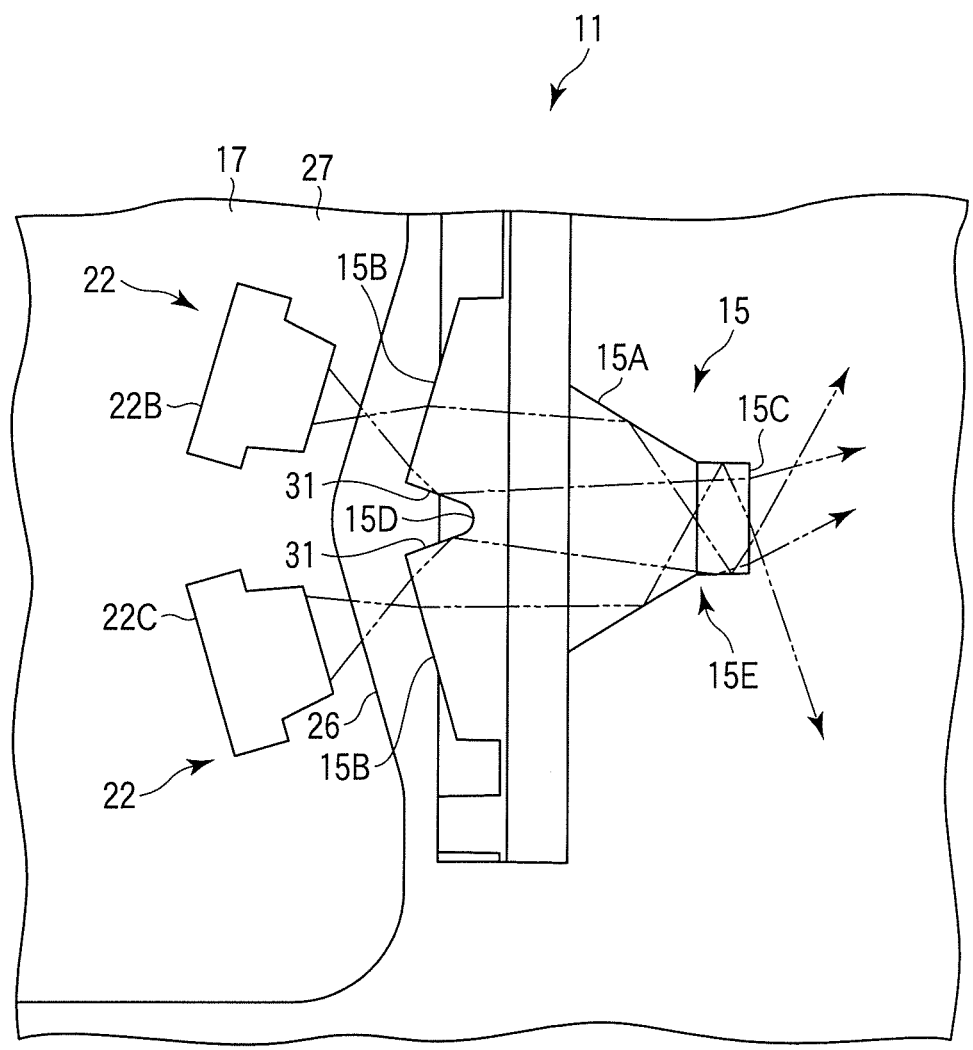
FIG. 6 is an exemplary schematic view showing light passing through the lens shown in FIG. 5.

As shown in FIG. 6, of light emitted from the first light emitting diodes 22, light applied to the cutout portion 15D is totally reflected to the main part 15A, and is guided to the display part 15C by being further reflected by the side surface of the main part 15A. Accordingly, the material of the lens 15, the installation angle of the cutout portion 15D, the installation position and angle of each of the first light emitting diodes 22 are set to allow light applied to the cutout portion 15D to be totally reflected to the display part 15C and effectively displayed by the display part 15C.

Light from first light emitting diode 22A is displayed by the display part 15C of the upper lens 15 in FIG. 2, and light from first light emitting diodes 22B, 22C is displayed by the display part 15C of the lower lens 15 in FIG. 2. Since first light emitting diode 22A is provided at the same angle relative to the lens 15 as first light emitting diodes 22B, 22C, the amount of light of first light emitting diode 22A is adjusted to fall within an appropriate range. With this configuration, first light emitting diode 22A is adjusted to look the same as first light emitting diodes 22B, 22C, thereby preventing the user from feeling a sense of strangeness.

In the first embodiment, the television apparatus 11 comprises, a printed wiring board 17, a plurality of light emitting diodes provided on the printed wiring board 17 and configured to emit light parallel to the printed wiring board 17, and a lens 15 comprising a plurality of light receiving parts 15B corresponding to the light emitting diodes, respectively, a display part 15C displaying light which has been emitted from the light emitting diodes and has entered through the light receiving parts 15B, and a cutout portion 15D extending from a position between the light receiving parts 15B to the display part 15C.

With this configuration, a path which guides light entered through one light receiving part 15B to the display part 15C can be separated from a path which guides light entered through another light receiving part 15B to the display part 15C by the cutout portion 15D. Accordingly, even when only one lens 15 is provided in correspondence with a plurality of light emitting diodes, light displayed by the display part 15C does not become feeble. More specifically, if only one lens 15 is provided in correspondence with a plurality of light emitting diodes, light entered through one light receiving part 15B may be reflected to the other light receiving part 15B and confined in the lens 15, and may not reach the display part 15C. However, with the above configuration, since the cutout portion 15D is provided between the light receiving parts 15B, even if part of light entered through one light receiving part 15B is applied to the other light receiving part 15B, the part of light can be reflected to the display part 15C. Accordingly, a sufficient amount of light can be secured at the display part 15C. Further, with the above configuration, the number of lenses 15 can be reduced, the space occupied by the lenses 15 can be reduced, and the size of the television apparatus 11 can be reduced.

In this case, each light emitting diode is oriented to the display part 15C to emit light to the display part 15C. With this configuration, of light emitted from the light emitting diodes, most of the intense light emitted in the frontal direction directly reaches the display part 15C. Accordingly, light which can travel straight to the display part 15C without involvement of reflection or the like in the lens 15 directly reaches the lens 15, and a sufficient amount of light can be secured at the display part 15C.

A surface 31 defining the cutout portion 15D is substantially parallel to an imaginary line connecting each of the light emitting diodes and the display part 15C. With this configuration, most of light emitted from the light emitting diodes to the cutout portion 15D can be totally reflected to the display part 15C. Accordingly, leakage of light from the cutout portion 15D to the outside of the lens 15 can be prevented to the utmost, and a sufficient amount of light can be secured at the display part 15C.

Further, the cutout portion 15D is substantially V-shaped. Therefore, the cutout portion 15D can be realized with a simple shape.

Next, referring to FIGS. 7-9, a second embodiment of the electronic apparatus will be explained. A portable computer 41, which is an example of the electronic apparatus of the second embodiment, is different from the television apparatus 11 of the first embodiment in terms of the appearance. However, most main elements are common to those of the first embodiment. Therefore, different elements will be mainly explained. The same elements will be assigned the same reference symbols, and the explanations thereof will be omitted.

In this embodiment, the near side to the user (that is, user side) is defined as the front F, the far side from the user is the rear R, the left-hand side of the user is the left, the right-hand side of the user is the right, the upper side from the user's position is up and the lower side from the user's position is down.

Figure 7:
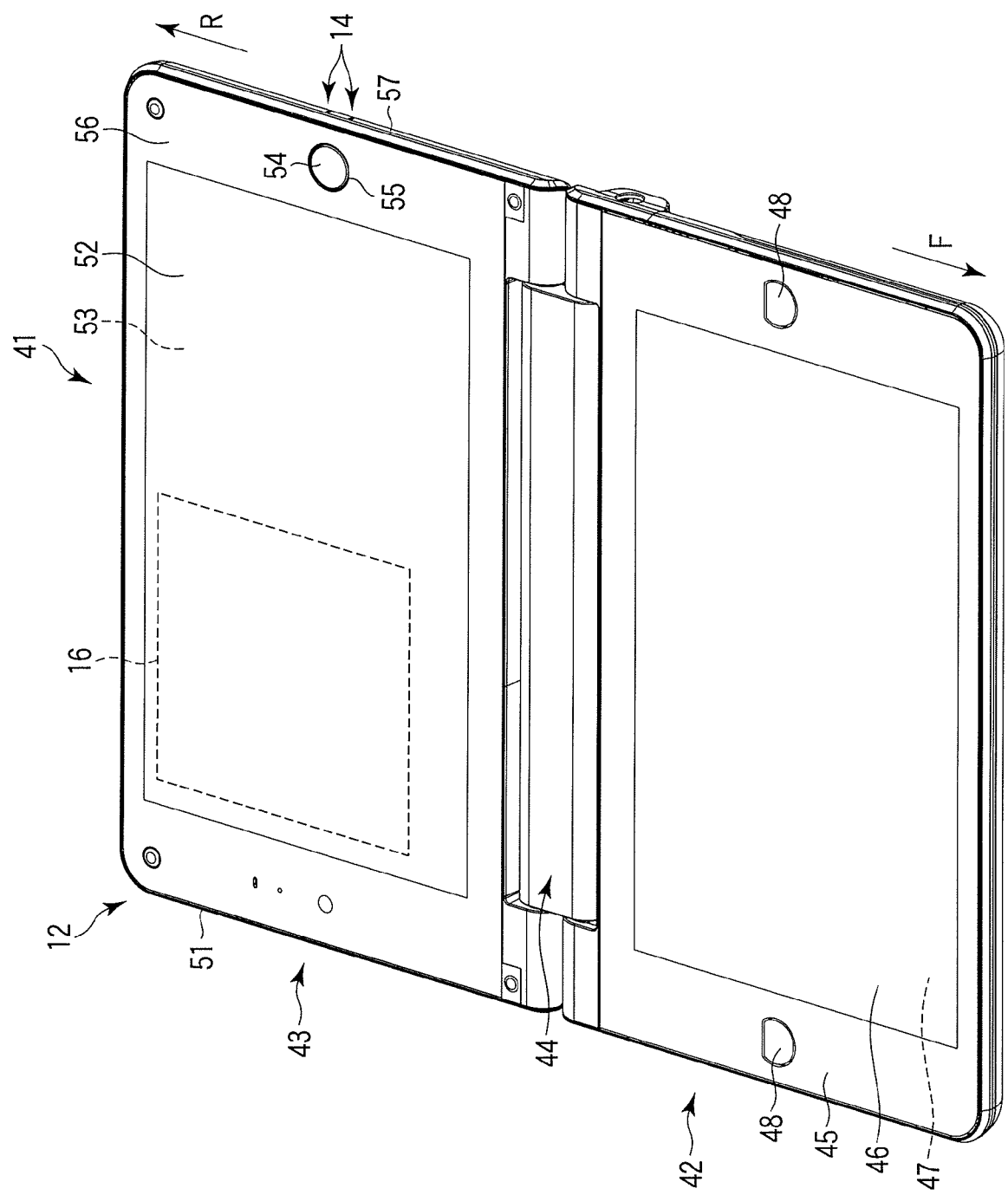
FIG. 7 is an exemplary perspective view showing a portable computer, which is an example of an electronic apparatus of a second embodiment.

As shown in FIG. 7, the portable computer 41 comprises a first unit 42 corresponding to the front F in FIG. 7, a second unit 43 corresponding to the rear R in FIG. 7, and a hinge unit 44 located between the first unit 42 and the second unit 43 and rotatably connecting the first unit 42 and the second unit 43.

The first unit 42 comprises a first case 45, a first touch panel 46 attached to the first case 45, and a first display 47 provided in the first case 45 below the first touch panel 46. The first display 47 is, for example, a liquid crystal display, and is located adjacent to the first touch panel 46. The first unit 42 comprises a pair of operation buttons 48 between which the first touch panel 46 is located.

Figure 9:
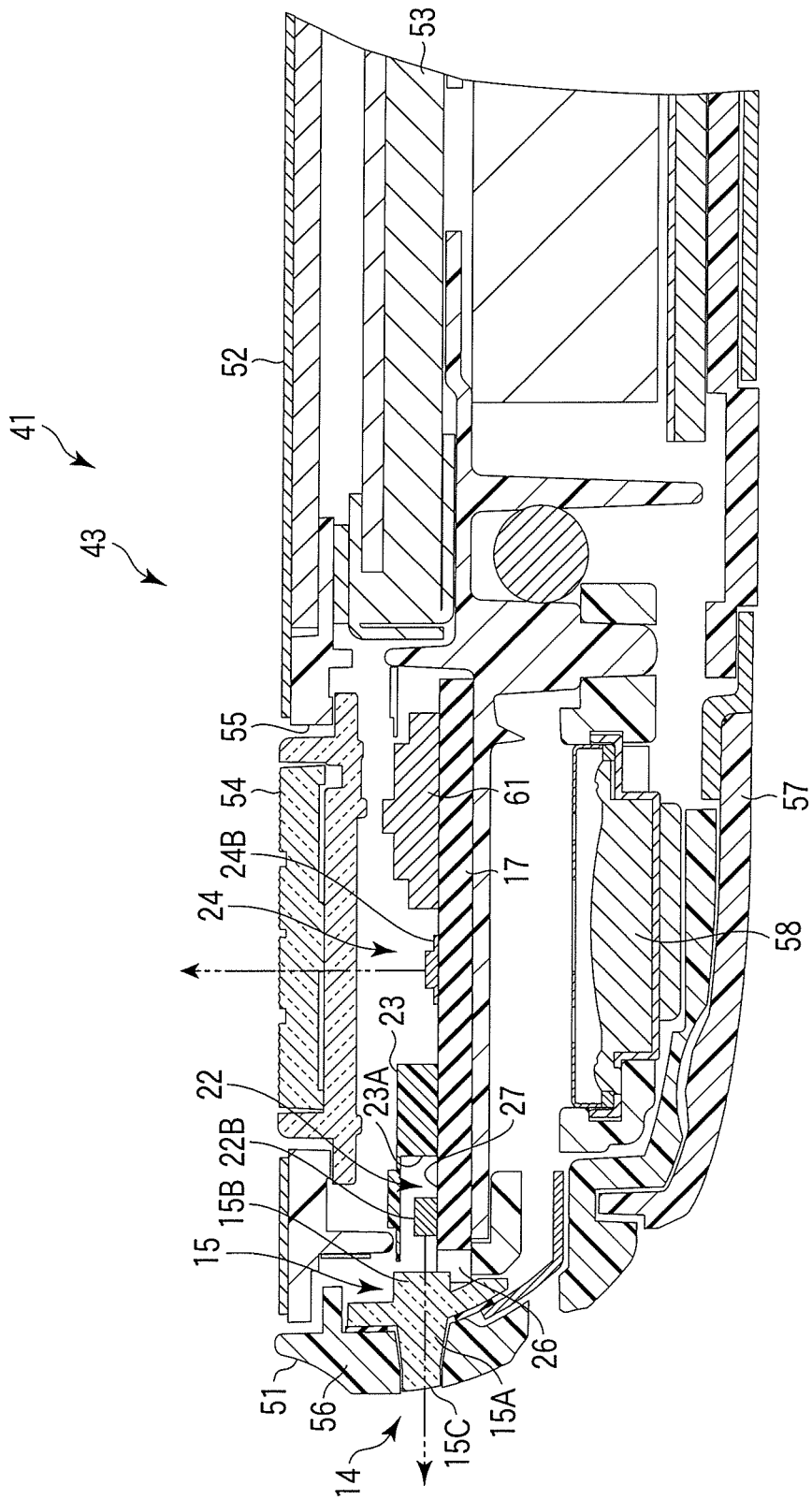
FIG. 9 is an exemplary cross-sectional view of the portable computer shown in FIG. 8, taken along line F9-F9.

As shown in FIGS. 7 and 9, the second unit 43 comprises a second case 51, a second touch panel 52 attached to the second case 51, a second display 53 provided in the second case 51 below the second touch panel 52, and a power button 54 located adjacent to the second touch panel 52. The power button 54 is fitted in a through hole 55 provided in the second case 51. The housing 12 comprises the first case 45 and the second case 51.

As shown in FIGS. 7 and 9, the second case 51 comprises a mask 56 covering the periphery of the surface on the front of the second touch panel 52 and the second display 53, and a cover 57 covering the surface on the back of the second touch panel 52 and the second display 53. The cover 57 of the second case 51 is provided with a pair of opening portions 14. The second unit 43 comprises a pair of lenses 15 fitted in the opening portions 14, respectively. The opening portions 14 and lenses 15 are provided in the vicinity of a speaker 58 described later.

Figure 8:
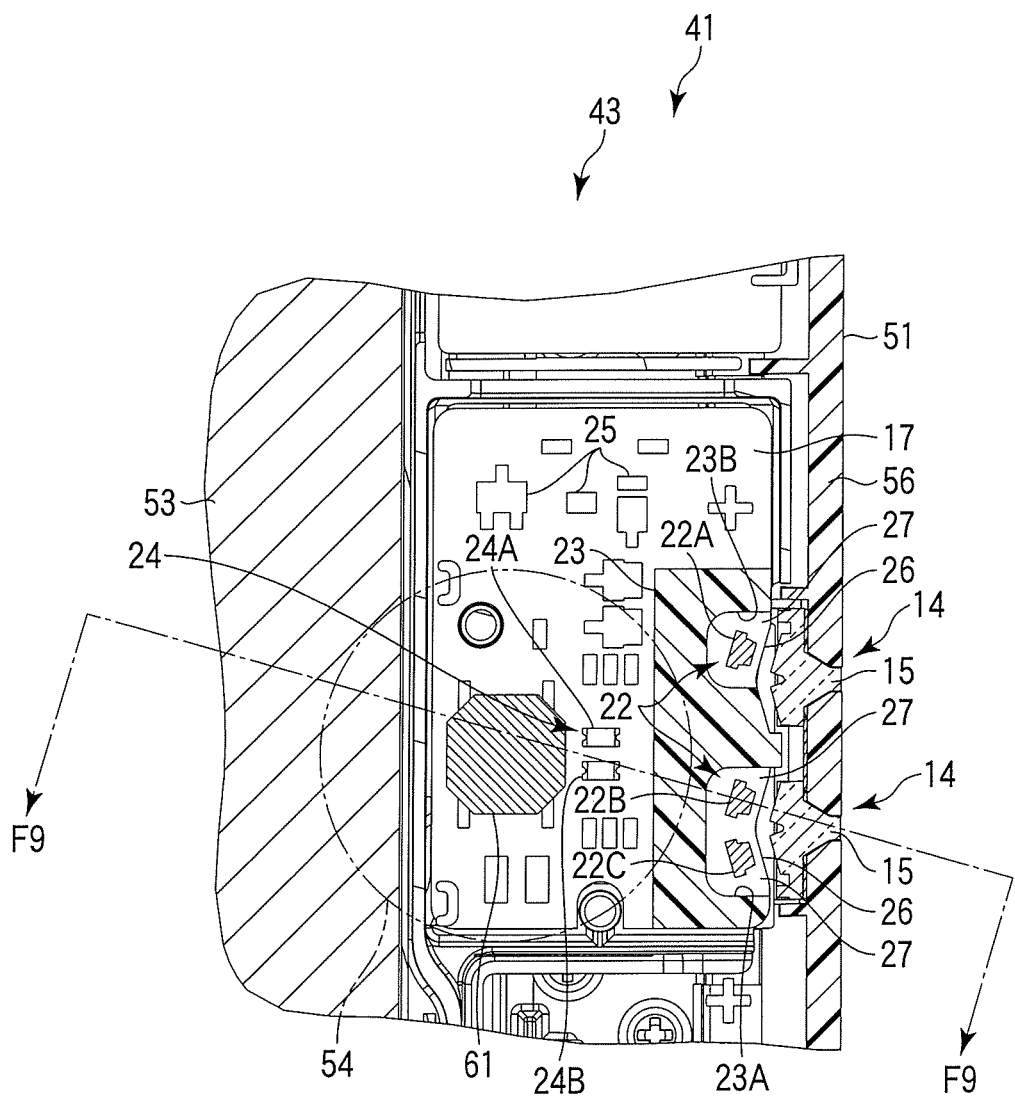
FIG. 8 is an exemplary enlarged cross-sectional view of the vicinity of a printed wiring board of the portable computer shown in FIG. 7.

As shown in FIGS. 7-9, the second unit 43 comprises in the second case 51, a system substrate 16 on which, for example, a CPU is mounted, a printed wiring board 17 electrically connected to the system substrate 16 via, for example, a flexible cable, a plurality of light emitting diodes 22 provided on the printed wiring board 17, a shade 23 surrounding the first light emitting diodes 22, a plurality of second light emitting diodes 24 located on the printed wiring board 17 at positions separated from the first light emitting diodes 22, a switch 61 provided on the printed wiring board 17 and configured to detect depression of the power button 54, and a speaker 58.

As shown in FIG. 8, on the printed wiring board 17, the first light emitting diodes 22 (light sources), the second light emitting diodes 24 and a plurality of other circuit components 25 are mounted at high density. The printed wiring board 17 is provided with a concave portion 26 taking a substantially triangular shape along the outer shape of the light receiving part 15B of the lens 15, and an edge portion 27 defining the periphery of the cutout portion 15D.

The plurality of first light emitting diodes 22 are aligned on the edge portion 27 of the printed wiring board 17 on one surface of the printed wiring board 17. In the present embodiment, three first light emitting diodes 22 are provided on the printed wiring board 17, but the number is not limited to three. First light emitting diode 22A, which is the upper one in FIG. 8, emits, for example, orange light while, for example, a wireless LAN is operating, thereby notifying the user of the operation. First light emitting diode 22B, which is the middle one in FIG. 8, emits, for example, orange light while, for example, a contained battery is being charged, thereby notifying the user of the charging operation. First light emitting diode 22C, which is the lower one in FIG. 8, emits, for example, green light, for example, in a state where charging of the contained battery has been completed (where power remains in the battery), thereby notifying the user of the state.

As shown in FIG. 8, each of the first light emitting diodes 22 is provided on an imaginary straight line connecting a display part 15C and light receiving part 15B of the lens 15, which will be described later. Each of the first light emitting diodes 22 is oriented and opposed to the display part 15C. As shown in FIG. 9, the first light emitting diode 22 is a side-lighting-type light emitting diode, which is configured to emit light parallel to the printed wiring board 17.

As shown in FIGS. 8 and 9, the shade 23 covers the side surfaces and top surfaces of the first light emitting diodes 22 at positions other than the pair of lenses 15. The shade 23 is provided with a first containing portion 23A depressed to contain two first light emitting diodes 22, and a second containing portion 23B depressed to contain one first light emitting diode 22. The shade 23 separates the first light emitting diodes 22 from the second light emitting diodes 24, and prevents, for example, light emitted from the second light emitting diodes 24 from being applied to the lenses 15 opposed to the first light emitting diodes 22.

As shown in FIG. 8, the second light emitting diodes 24 are located on the printed wiring board 17 away from the edge portion 27, i.e., on an approximately center portion of the printed wiring board 17. As shown in FIG. 12, each of the second light emitting diodes 24 is an upward-lighting-type diode, and is configured to emit light in a direction crossing (orthogonal to) the direction in which the printed wiring board 17 extends.

As shown in FIG. 9, one of the second light emitting diodes 24 emits light to pass through the power button 54, and can notify the user of the power-on state of the portable computer 41. The other of the second light emitting diodes 24 emits light to pass through the power button 54, and can notify the user that the portable computer 41 is in a suspended (sleep) state. As shown in FIG. 9, the power button 54 has a surface processed to increase surface roughness, and can diffuse light from the second light emitting diodes 24 to the surroundings.

The lens 15 of the present embodiment has the same structure as the lens 15 of the first embodiment shown in FIG. 4. The cutout portion 15D has a substantially V-shaped cross section. As shown in FIG. 5, a surface 31 defining the cutout portion 15D is substantially parallel to an imaginary line connecting each of the first light emitting diode 22 and the display part 15C.

In the second embodiment, the portable computer 41 comprises, a plurality of light emitting diodes, and a lens 15 comprising a plurality of light receiving parts 15B corresponding to the light emitting diodes, respectively, a display part 15C displaying light which has been emitted from the light emitting diodes and has entered through the light receiving parts 15B, the lens 15 being provided with a cutout portion 15D extending from a position between the light receiving parts 15B to the display part 15C.

With this configuration, since the cutout portion 15D is provided between the light receiving parts 15B, even if part of light entered through one light receiving part 15B is applied to the other light receiving part 15B, the part of light can be reflected to the display part 15C. Accordingly, a sufficient amount of light can be secured at the display part 15C. Further, the number of lenses 15 can be reduced, the space occupied by the lenses 15 in the portable computer 41 can be reduced, and the size of the portable computer 41 can be reduced.

Next, referring to FIG. 10, a third embodiment of the electronic apparatus will be explained. A portable computer 41, which is an example of the electronic apparatus of the third embodiment, is different from the portable computer 41 of the second embodiment in terms of the number of first light emitting diodes 22 and the shape of the lens 15. However, the other elements are mostly common to those of the second embodiment. Therefore, elements different from those of the second embodiments will be mainly explained. The same elements will be assigned the same reference symbols, and the explanations thereof will be omitted.

Figure 10:
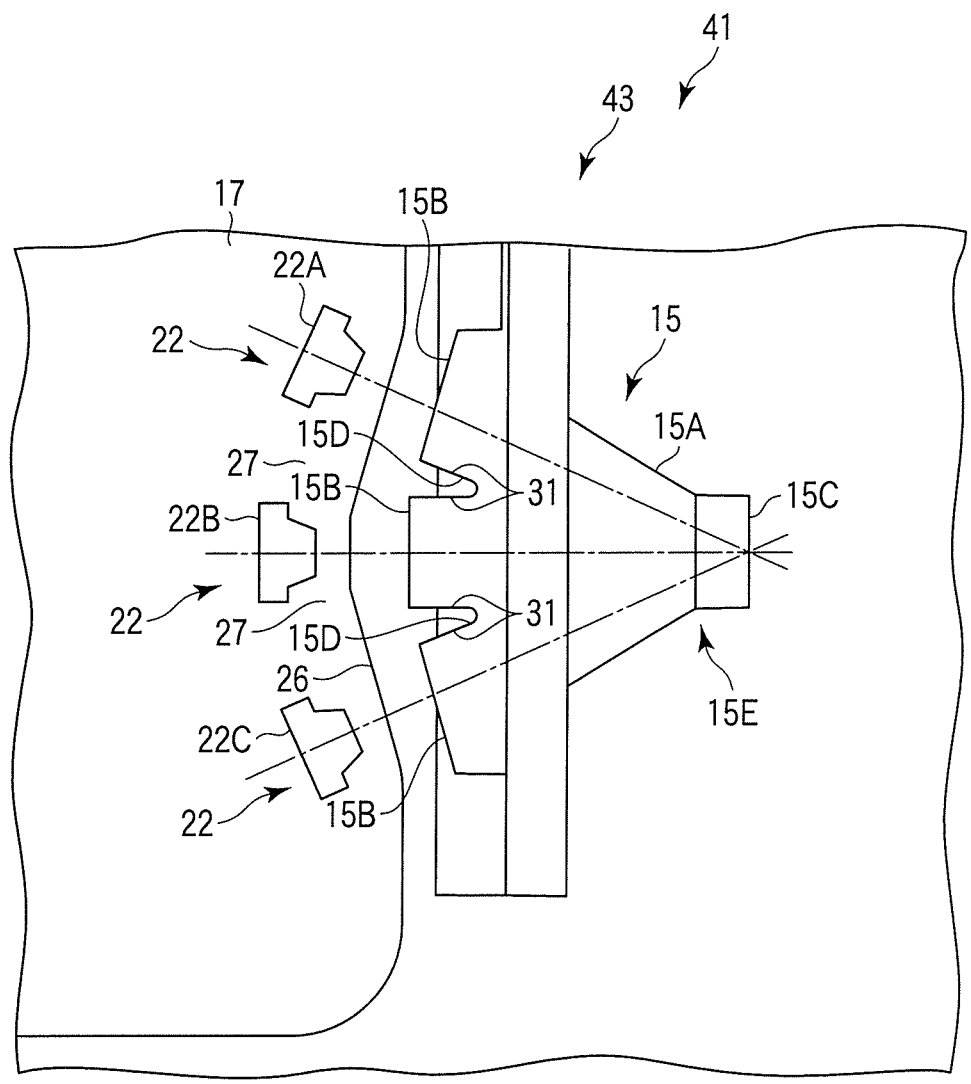
FIG. 10 is an exemplary enlarged plan view of the vicinity of a lens of a portable computer, which is an example of an electronic apparatus of a third embodiment.

As shown in FIG. 10, on the printed wiring board 17, for example, three first light emitting diodes 22 are provided. Each of the first light emitting diodes 22 is located on an imaginary straight line connecting a display part 15C and light receiving part 15B of the lens 15, which will be described later. Each of the first light emitting diodes 22 is oriented and opposed to the display part 15C of the lens 15.

First light emitting diode 22A, which is the upper one in FIG. 10, emits, for example, orange light while, for example, a contained battery is being charged, thereby notifying the user of the charging operation. First light emitting diode 22B, which is the middle one in FIG. 10, emits, for example, green light, for example, in a state where charging of the contained battery has been completed, thereby notifying the user of the state. First light emitting diode 22C, which is the lower one in FIG. 10, emits, for example, red light in such a manner that the light blinks at predetermined intervals, for example, when the amount of power remaining in the battery is small (e.g., ⅓ or ¼), thereby notifying the user of the state.

As shown in FIG. 10, each lens 15 comprises a main part 15A shaped like a truncated cone, a plurality of light receiving parts 15B protruding from the lower base portion of the main part 15A to the first light emitting diodes 22, a display part 15C provided on the upper base portion of the main part 15A, and wedge-shaped cutout portions 15D provided between the light receiving parts 15B.

In the lens 15 of the present embodiment, three light receiving parts 15B are provided in such a manner as to correspond to three first light emitting diodes 22, respectively, and two cutout portions 15D are provided. The main part 15A, light receiving parts 15B and display part 15C are formed integrally of a transparent material, such as an acrylic resin. The main part 15A is fitted in the opening portion 14 of the housing 12.

The lens 15 is symmetrical (right-left symmetrical) with respect to a central axis 28 of the main part 15A. As shown in FIG. 10, the light receiving parts 15B are fitted in the concave portion 26 of the printed wiring board 17 in such a manner as to correspond to the first light emitting diodes 22, respectively. The display part 15C is configured to display light which has been emitted from the first light emitting diodes 22 and has entered through the light receiving parts 15B.

In the present embodiment, for example, of light emitted from the first light emitting diodes 22, light emitted to the cutout portion 15D is totally reflected to the main part 15A, and is guided to the display part 15C by being further reflected by the side surface of the main part 15A. Accordingly, the material of the lens 15, the angle of the cutout portion 15D, and the installation position and angle of each of the first light emitting diodes 22 are set to allow light emitted to the cutout portion 15D to be totally reflected to the display part 15C and effectively displayed by the display part 15C.

According to the third embodiment, even when three first light emitting diodes 22, three light receiving parts 15B and two cutout portions 15D are provided, a sufficient amount of light can be secured at the display part 15C, the number of lenses 15 can be reduced, and the size of the portable computer 41 can be reduced. The third embodiment is particularly effective when three states of the portable computer 41 need to be displayed as described above.

Next, referring to FIGS. 11 and 12, a fourth embodiment of the electronic apparatus will be explained. A portable computer 41, which is an example of the electronic apparatus of the fourth embodiment, is different from the portable computer 41 of the second embodiment in terms of the number of first light emitting diodes 22 and the shape of the lens 15. However, the other elements are mostly common to those of the second embodiment. Therefore, elements different from those of the second embodiments will be mainly explained. The same elements will be assigned the same reference symbols, and the explanations thereof will be omitted.

Figure 11:
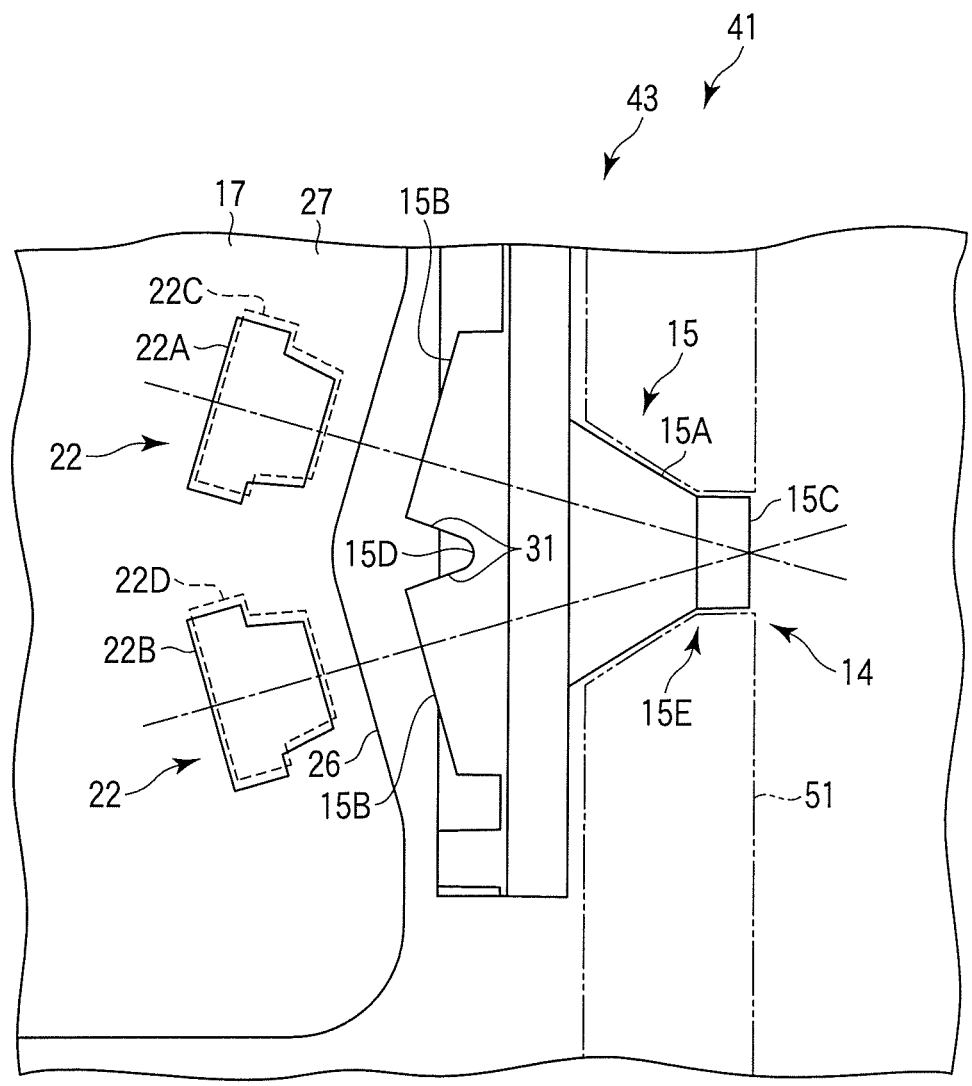
FIG. 11 is an exemplary enlarged plan view of the vicinity of a lens of a portable computer, which is an example of an electronic apparatus of a fourth embodiment.

As shown in FIGS. 11 and 12, on each surface of the printed wiring board 17, for example, two first light emitting diodes 22 are provided. Accordingly, four light emitting diodes 22 are provided in total in the present embodiment. Each of two first light emitting diodes 22 on one surface is located on an imaginary straight line connecting a display part 15C and light receiving part 15B of the lens 15, which will be described later, and is oriented and opposed to the display part 15C of the lens 15. Similarly, each of two first light emitting diodes 22 on the other surface is located on an imaginary straight line connecting a display part 15C and light receiving part 15B of the lens 15, which will be described later, and is opposed to the display part 15C.

First light emitting diode 22A on one surface of the printed wiring board 17 among the four light emitting diodes 22 emits, for example, orange light while, for example, a contained battery is being charged, thereby notifying the user of the charging operation. First light emitting diode 22B provided on the same surface as first light emitting diode 22A, emits, for example, green light, for example, in a state where charging of the contained battery has been completed, thereby notifying the user of the state. First light emitting diode 22C on the other surface of the printed wiring board 17 emits, for example, red light in such a manner that the light blinks at predetermined intervals, for example, when the amount of power remaining in the battery is small (e.g., ⅓ or ¼), thereby notifying the user of the state. First light emitting diode 22D provided on the same surface as first light emitting diode 22C, emits, for example, continuous red light, for example, when the portable computer 41 is connected to an alternating current power source for household use, thereby notifying the user of the state. In the present embodiment, first light emitting diode 22A and first light emitting diode 22D may be turned on at the same time.

As shown in FIGS. 11 and 12, each lens 15 comprises a main part 15A shaped like a truncated cone, a plurality of light receiving parts 15B protruding from the lower base portion of the main part 15A to the first light emitting diodes 22, a display part 15C provided on the upper base portion of the main part 15A, and a wedge-shaped cutout portion 15D provided between the light receiving parts 15B.

In the lens 15 of the present embodiment, four light receiving parts 15B are provided in such a manner as to correspond to the four first light emitting diodes 22, respectively. In the lens 15 of the present embodiment, four light receiving parts 15B are provided in total in correspondence with four first light emitting diodes 22. Further, in the lens 15, the cutout portion 15D takes a substantially cross shape, and is located between the light receiving parts 15B. The main part 15A, light receiving parts 15B and display part 15C are integrally formed of a transparent material, such as an acrylic resin.

The lens 15 is substantially symmetrical (right-left symmetrical) with respect to a central axis of the main part 15A. For example, of light emitted from the first light emitting diodes 22, light emitted to the cutout portion 15D is totally reflected to the main part 15A, and is guided to the display part 15C by being further reflected by the side surface of the main part 15A. Accordingly, the material of the lens 15, the angle of the cutout portion 15D, the installation position and angle of each of the first light emitting diodes 22 are set to allow light emitted to the cutout portion 15D to be totally reflected to the display part 15C and effectively displayed by the display part 15C.

According to the fourth embodiment, even when four first light emitting diodes 22 and four light receiving parts 15B are provided, a sufficient amount of light can be secured at the display part 15C, and the number of lenses 15 can be reduced. Further, since the first light emitting diodes 22 are provided on the both surfaces of the printed wiring board 17, the space use efficiency in the housing 12 of the portable computer 41 can be improved, and the size of the portable computer 41 can be reduced. The fourth embodiment is particularly effective when four states of the portable computer 41 need to be displayed as described above.

Next, referring to FIG. 13, a fifth embodiment of the electronic apparatus will be explained. A portable computer 41, which is an example of the electronic apparatus of the fifth embodiment, is different from the portable computer 41 of the second embodiment in terms of the installation angle of each of the first light emitting diodes 22 and the shape of the lens 15. However, the other elements are mostly common to those of the second embodiment. Therefore, elements different from those of the second embodiments will be mainly explained. The same elements will be assigned the same reference symbols, and the explanations thereof will be omitted.

Figure 13:
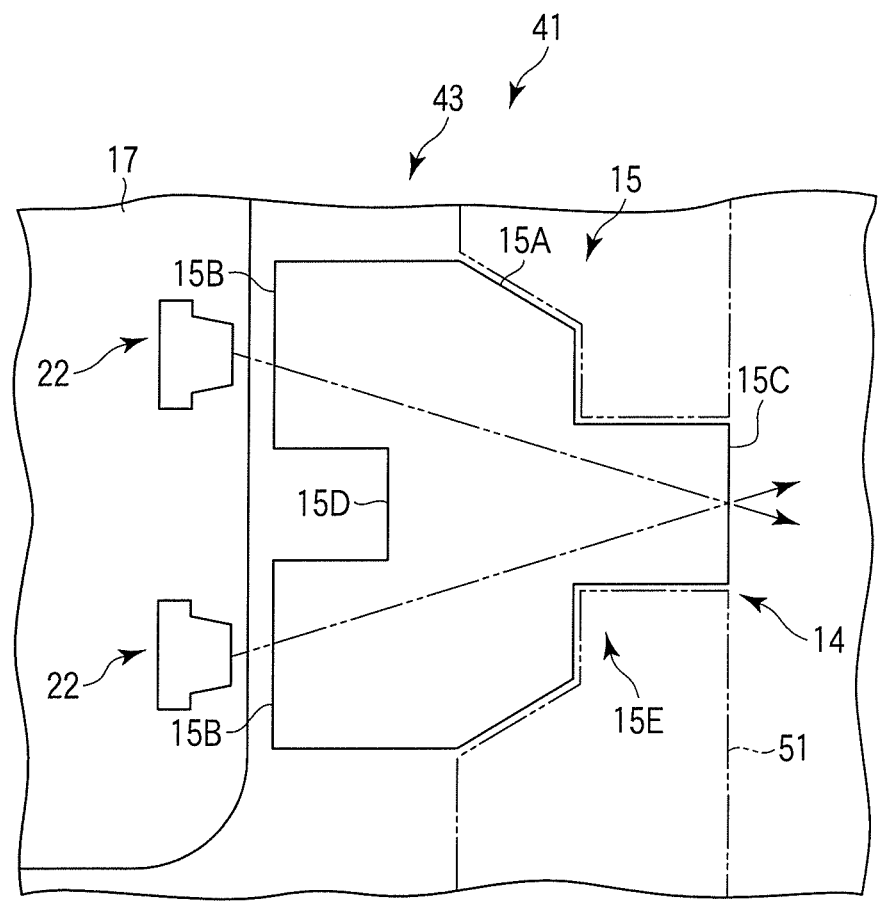
FIG. 13 is an exemplary enlarged plan view of the vicinity of a lens of a portable computer, which is an example of an electronic apparatus of a fifth embodiment.

As shown in FIG. 13, on the printed wiring board 17, two first light emitting diodes 22 are provided. The first light emitting diodes 22 are oriented to the lens 15 and are parallel to each other. The first light emitting diodes 22 are located to be opposed to the light receiving parts 15B of the lens 15, respectively. Each of the first light emitting diodes 22 is a side-lighting-type light emitting diode, which is configured to emit light parallel to the printed wiring board 17.

Each lens 15 comprises a main part 15A shaped like a truncated cone, a plurality of light receiving parts 15B protruding from the lower base portion of the main part 15A to the first light emitting diodes 22, a display part 15C provided on the upper base portion of the main part 15A, and a square cutout portion 15D provided between the light receiving parts 15B. The main part 15A, light receiving parts 15B and display part 15C are integrally formed of a transparent material, such as an acrylic resin. The main part 15A is fitted in the opening portion 14 of the housing 12.

As shown in FIG. 13, the lens 15 is symmetrical (right-left symmetrical) with respect to a central axis of the main part 15A. In the lens 15 of the present embodiment, two light receiving parts 15B are provided. The display part 15C is configured to display light which has been emitted from the first light emitting diodes 22 and has enters through the light receiving parts 15B. The display part 15C has a surface processed (subjected to texturing) to increase surface roughness, and can diffuse light at the surface.

According to the fifth embodiment, since part of light emitted from the light emitting diodes 22 directly reaches the display part 15C, a sufficient amount of light is displayed at the display part 15C to the outside. Further, since the cutout portion 15D prevents light from one light receiving part 15B from traveling to another light receiving part 15B, a fixed amount of light can be secured at the display part 15C. The illumination efficiency of the present embodiment is lower than those of the above-described embodiments. However, an amount of light sufficient for the purpose of notifying the user of the state of the portable computer 41 can be secured.

Next, referring to FIGS. 14 and 15, a sixth embodiment of the electronic apparatus will be explained. A portable computer 41, which is an example of the electronic apparatus of the sixth embodiment, is different from the portable computer 41 of the second embodiment in terms of the type and installation angle of each of the first light emitting diodes 22 and the shape of the lens 15. However, the other elements are mostly common to those of the second embodiment. Therefore, elements different from those of the second embodiments will be mainly explained. The same elements will be assigned the same reference symbols, and the explanations thereof will be omitted.

As shown in FIG. 14, on the printed wiring board 17, two first light emitting diodes 22 are provided. The first light emitting diodes 22 are provided parallel to each other along the edge portion of the printed wiring board 17. The first light emitting diodes 22 are located to be opposed to the light receiving parts 15B of the lens 15, respectively. Different from the above-described embodiments, each of the first light emitting diodes 22 is an upward-lighting-type diode configured to emit light in a direction crossing (orthogonal to) a direction in which the printed wiring board 17 extends.

Each lens 15 comprises a main part 15A, a plurality of light receiving parts 15B protruding from the lower base portion of the main part 15A to the first light emitting diodes 22, a display part 15C provided on the upper base portion of the main part 15A, and a square cutout portion 15D provided between the light receiving parts 15B. The main part 15A, light receiving parts 15B and display part 15C are integrally formed of a transparent material, such as an acrylic resin. The main part 15A and display part 15C are fitted in the opening portion 14 of the housing 12.

As shown in FIG. 14, the lens 15 is symmetrical (right-left symmetrical) with respect to a central axis of the main part 15A. In the lens 15 of the present embodiment, two light receiving parts 15B are provided. The display part 15C is configured to display light which has been emitted from the first light emitting diodes 22 and entered through the light receiving parts 15B. The display part 15C has a surface processed (subjected to texturing) to increase surface roughness, and can diffuse light at the surface.

The illumination efficiency of the sixth embodiment is lower than those of the above-described embodiments. However, light from the first light emitting diodes 22 can be guided to the display part 15C by the cutout portion 15D. Therefore, in the present embodiment, an amount of light sufficient for the purpose of notifying the user of the state of the portable computer 41 can be secured.

The electronic apparatus is not limited to the television apparatus 11 and portable computer 41 adopted in the above embodiments, and may be another electronic apparatus, such as a mobile phone.

The electronic apparatus is not limited to the ones described in the above embodiments, and the structural elements of the electronic apparatus may be modified within the spirit of the invention in the stage of implementation. Further, the invention is variously embodied by appropriately combining a plurality of structural elements disclosed in the above descriptions of embodiments. For example, some structural elements may be omitted from all the structural elements disclosed in the above descriptions of embodiments. Moreover, structural elements in different embodiments may be combined where necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing provided with an opening portion;
a printed wiring board contained in the housing and provided with a concave portion and a plurality of light sources located near the concave portion; and
a lens at least partially located in the concave portion and allowing passage of light through the opening portion, the lens comprises a main part, a display part to which light from the plurality of light sources is oriented, a plurality of light receiving surfaces each corresponding to a separate light source of the plurality of light sources and a cutout portion provided between the plurality of light receiving surfaces,
wherein of light emitted from at least one of the plurality of light sources, light applied to the cutout portion is reflected to the main part of the lens and is guided to the display part by being further reflected by a side surface of the main part of the lens.

2. The electronic apparatus of claim 1, wherein each of the plurality of light sources is oriented to the opening to emit light to the opening.

3. The electronic apparatus of claim 1, wherein a surface defining the cutout portion is substantially parallel to an imaginary line connecting said each of the plurality of light sources and the opening.

4. The electronic apparatus of claim 1, wherein the cutout portion is substantially V-shaped.

5. The electronic apparatus of claim 1, wherein the plurality of light sources are provided on one surface of the printed wiring board.

6. The electronic apparatus of claim 1, wherein the plurality of light sources are provided on both surfaces of the printed wiring board.

7. The electronic apparatus of claim 1, further comprising:
a touch panel attached to the housing; and
a display provided below the touch panel and inside the housing.

8. The electronic apparatus of claim 7, wherein the housing comprises:
a mask covering a periphery of a surface on a front of the touch panel and the display; and
a cover covering a periphery of a surface on a back of the touch panel and the display, the cover comprising a pair of openings and a pair of lenses fitted in the opening portions.

9. The electronic apparatus of claim 7, wherein the housing comprises:
a mask covering a periphery of a surface on a front of the touch panel and the display; and
a cover covering a periphery of a surface on a back of the touch panel and the display,
the cover comprising a pair of openings and a pair of lenses fitted in the opening portions.

10. The electronic apparatus of claim 9, wherein the openings and the lenses are provided near a speaker.

11. The electronic apparatus of claim 1, wherein the housing contains: a system substrate on which a CPU is mounted, the printed wiring board electrically connected to the system substrate via a flexible cable; the plurality of light sources provided on the printed wiring board; a shade surrounding the plurality of light sources; a plurality of second light sources located on the printed wiring board at positions separated from the plurality of light sources; and a speaker.

12. The electronic apparatus of claim 1, wherein the plurality of light sources are light emitting diodes.

13. The electronic apparatus of claim 1, wherein a surface defining the cutout portion is substantially parallel to an imaginary line connecting said each of the plurality of light sources and the display part.

14. The electronic apparatus of claim 1, wherein the display part has a surface processed to increase surface roughness, and is configured to diffuse light at the surface.

15. The electronic apparatus of claim 1, wherein the light applied to the cutout portion is totally reflected to the main body of the lens.

16. The electronic apparatus of claim 1, wherein the housing contains: a system substrate on which a CPU is mounted, the printed wiring board electrically connected to the system substrate via a flexible cable; the plurality of light sources provided on the printed wiring board; a shade surrounding the plurality of light sources; a plurality of second light sources located on the printed wiring board at positions separated from the plurality of light sources; a switch provided on the printed wiring board and configured to detect depression of a power button; and a speaker.

17. The electronic apparatus of claim 1, wherein the cutout portion is extending in a thickness direction of the printed wiring board and provided in a part facing the concave portion.

18. The electronic apparatus of claim 1, wherein the cutout portion is provided in a portion of the lens that enters a deepest part of the concave portion.

19. The electronic apparatus of claim 1, wherein the lens comprises the main part integrally formed of a transparent material with the plurality of light receiving surfaces and the display part.

20. The electronic apparatus of claim 1, wherein each of the plurality of light receiving surfaces correspond to a unique light source of the plurality of light sources.

\* \* \* \* \*